United States Patent
Fong et al.

(10) Patent No.: US 10,616,746 B2
(45) Date of Patent: Apr. 7, 2020

(54) SYSTEM, DEVICE, AND METHOD FOR DISTRESS RESPONSE

(71) Applicant: PPIP LLC, Tempe, AZ (US)

(72) Inventors: Michael Fong, Chandler, AZ (US); Neric Hsin-wu Fong, Tempe, AZ (US); Teddy David Thomas, Bedford, NH (US)

(73) Assignee: PPIP, LLC, Tempe, AZ (US)

(*) Notice: Subject to any disclaimer, the term of this patent is extended or adjusted under 35 U.S.C. 154(b) by 0 days.

(21) Appl. No.: 16/272,899

(22) Filed: Feb. 11, 2019

(65) Prior Publication Data

US 2020/0045527 A1 Feb. 6, 2020

Related U.S. Application Data

(60) Provisional application No. 62/630,125, filed on Feb. 13, 2018.

(51) Int. Cl.
| | |
|---|---|
| *H04M 11/04* | (2006.01) |
| *H04W 4/90* | (2018.01) |
| *G06F 3/01* | (2006.01) |
| *H04B 1/3888* | (2015.01) |
| *H04W 76/10* | (2018.01) |

(52) U.S. Cl.
CPC ............ *H04W 4/90* (2018.02); *G06F 3/017* (2013.01); *H04B 1/3888* (2013.01); *H04W 76/10* (2018.02)

(58) Field of Classification Search
CPC ......... H04W 4/90; H04W 76/10; G06F 3/017; H04B 1/3888
USPC ........................................ 455/404.1
See application file for complete search history.

(56) References Cited

U.S. PATENT DOCUMENTS

| | | | |
|---|---|---|---|
| 9,258,394 B2 * | 2/2016 | Sobti | H04M 1/0254 |
| 2016/0156378 A1 * | 6/2016 | Linari | H04M 1/0297 |
| | | | 455/575.1 |

* cited by examiner

Primary Examiner — Amancio Gonzalez
(74) *Attorney, Agent, or Firm* — Fernando & Partners, LLP (57) ABSTRACT

In accordance with some embodiments, an apparatus for privacy protection is provided. The apparatus includes a housing arranged to hold a second device and sensor(s), where the sensor(s) are operable to obtain a tactile input. The apparatus also includes a communication interface operable to communicate with the second device. Additionally, the apparatus includes a controller operable to direct the second device, through the communication interface, to generate a distress response in response to receiving the tactile input. In some embodiments, the apparatus also includes remote communication device(s) to communicate with a remote source. In such embodiments, the controller is coupled to the remote communication device(s), where the controller receives the geo-fencing information through the one or more communication devices, compares the information with movement and location information of the apparatus, and determines whether to direct the second device to enter a distress mode based on the comparison.

20 Claims, 5 Drawing Sheets

SYSTEM, DEVICE, AND METHOD FOR DISTRESS RESPONSE

PRIORITY CLAIM

This application claims priority to U.S. provisional patent application No. 62/630,125 filed on Feb. 13, 2018, the contents of which are hereby incorporated by reference.

TECHNICAL FIELD

This relates generally to the field of privacy protection, and more specifically to an apparatus that activates or deactivates a device in order to generate a distress response.

BACKGROUND

Smartphones have sensors for collecting information of a user, including the surroundings of the user, e.g., microphones for recording voice, cameras for recording images, and an inertial measurement unit (IMU) for measuring location and position of the user. Smartphones also have radios for local or remote communications, such as a cellular radio for communicating with a base station, a Global Positioning System (GPS) radio for communicating with a satellite, a near field communication (NFC) radio, a WiFi radio, and/or a Bluetooth radio for pairing with another device nearby. These sensors and radios are capable of providing a wealth of user information to third parties. Using such information, one may piece together real-time and/or historical records of the user.

Currently, most smartphones do not alert users when user private data are collected and/or disseminated. Consequently, when third-parties (e.g., hackers) gain unwanted access to a smartphone (e.g., hijack), a user may not be aware of the privacy invasion. Moreover, when the smart devices are in danger of being hijacked, conventional systems and devices do not provide methods of efficient distress mode activation, and thus cannot effectively protect the smart devices.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

In accordance with common practice the various features illustrated in the drawings cannot be drawn to scale. Accordingly, the dimensions of the various features can be arbitrarily expanded or reduced for clarity. In addition, some of the drawings cannot depict all of the components of a given system, method or device. Finally, like reference numerals can be used to denote like features throughout the specification and figures.

DETAILED DESCRIPTION

Accordingly, described herein is an apparatus (also known as a smart case, a safe case, a secure case, an active case, or an active base) that protects a device (e.g., a smart device) used by a user from potential privacy invasion. In some embodiments, when the user becomes aware of potential threat, the user enters a tactile input into the apparatus and/or the device. The apparatus, upon receiving the tactile input, determines if the manner in which the input was entered indicates that the user intends for the device to be protected. For example, policies can be defined that specify predefined input patterns, such that a match of the user input to a predefined input pattern indicates the user's intent to place the device in a distress mode. In some embodiments, the predefined input patterns include a gesture or movement sequence pattern. In some embodiments, once in the distress mode, the apparatus and/or the device generates a distress response, such as sending out a distress signal, shutting down the device, communicating with emergency services, and/or shielding the device from intrusion. In some embodiments, without user intervention, the apparatus actively monitors the movement and location of the device and places the device in the distress mode when the device approaches or crosses a high threat area. In such embodiments, the apparatus further directs the device to end the distress mode in response to a determination that the device exits the high threat area.

In accordance with some embodiments, an apparatus includes a housing arranged to hold a second device; one or more sensors, at least partially supported by the housing, operable to obtain a tactile input; a communication interface, at least partially supported by the housing and connectable to the second device, operable to communicate with the second device; and a controller, coupled to the communication interface and the one or more sensors, operable to direct the second device, through the communication interface, to generate a distress response in response to receiving the tactile input.

In accordance with some embodiments, a device includes one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of a device, cause the device to perform or cause performance of the operations of any of the methods described herein. In accordance with some embodiments, a device includes means for performing or causing performance of the operations of any of the methods described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when", "upon", "in response to determining", or "in response to detecting", depending on the context. Similarly, the phrase "if it is determined" or "if [a stated condition or event] is detected" is, optionally, construed to mean "upon determining", "in response to determining", "upon detecting [the stated condition or event]," or "in response to detecting [the stated condition or event]," depending on the context.

It should be appreciated that in the development of any actual embodiment (as in any development project), numerous decisions must be made to achieve the developers' specific goals (e.g., compliance with system and business-related constraints), and that these goals will vary from one embodiment to another. It will also be appreciated that such development efforts might be complex and time consuming, but would nevertheless be a routine undertaking for those of ordinary skill in the art of image capture having the benefit of this disclosure.

Figure 1:
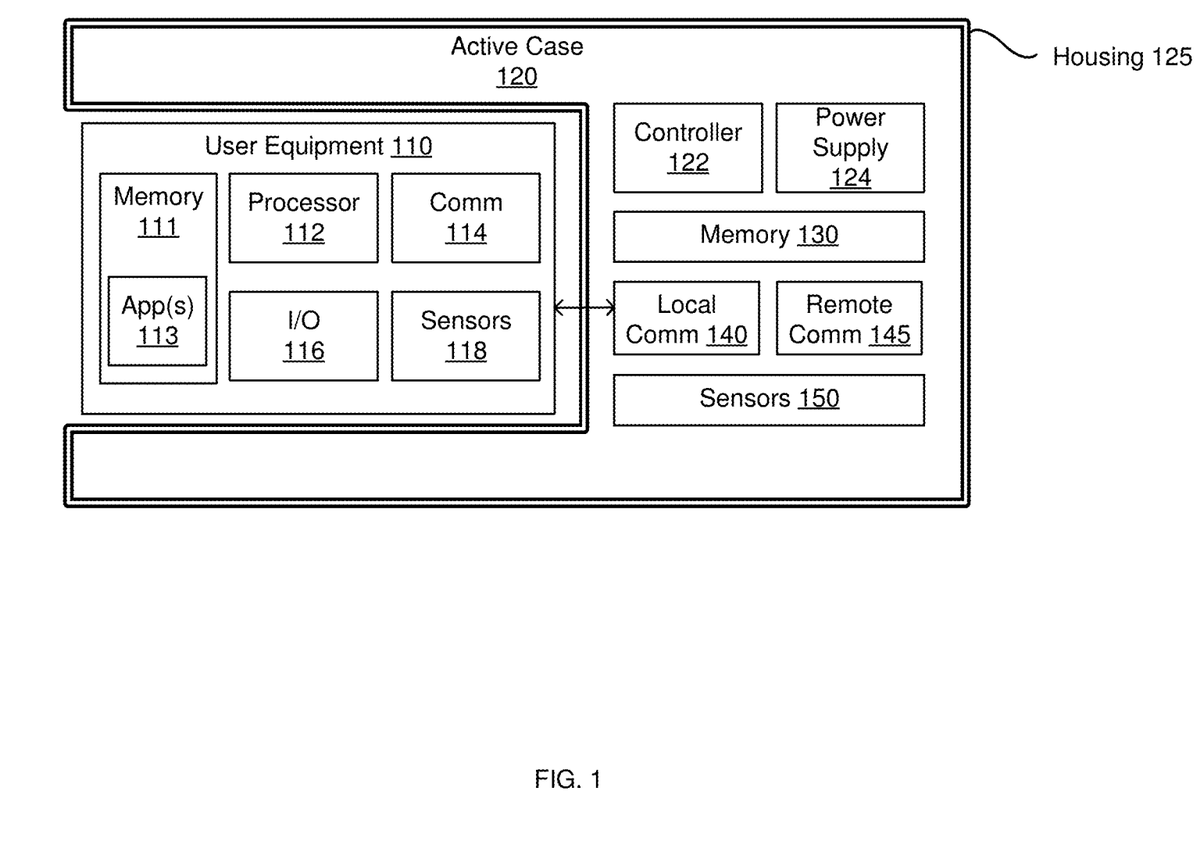
FIG. 1 is a block diagram of an exemplary apparatus holding a personal communication device in accordance with some embodiments.

Referring to FIG. 1, a simplified block diagram of an apparatus 120 (also known as a smart case, a safe case, a secure case, an active case, or an active base) holding a personal communication device 110 (also known as a user equipment) is depicted, in accordance with some embodiments. Different from a conventional base or case that merely holds a personal communication device, the active case 120 actively monitors the personal communication device 110, collects information from the personal communication device 110, and uses the information for threat analysis. The information gathered by the active case 120 provides an enterprise network visibility of activities even when the personal communication device 110 is operating in public places. As such, through the active case 120, the enterprise is capable of controlling network activities involving the personal communication device 110. In particular, the active monitoring of the personal communication device 110 by the active case 120 enables threat detection. Upon detecting potential threat, the active case 120 actively directs the personal communication device 110 to enter a distress mode for the privacy protection of the user. It should be noted that while the aforementioned features and components are illustrated, those of ordinary skill in the art will appreciate from the present disclosure that various other features and components have not been illustrated for the sake of brevity and so as not to obscure more pertinent aspects of the embodiments disclosed herein. Also, those of ordinary skill in the art will appreciate from the present disclosure that the functions of the components described below can be combined into one or more components and/or further sub-divided into additional sub-components; and, that the components described below are provided as exemplary configuration of the various aspects and functions described herein.

In some embodiments, the active case 120 includes a housing 125 arranged to hold the personal communication device 110 (e.g., a smartphone, a wearable, a tablet, etc.). In some embodiments, the housing 125 includes a plurality of components mateable with one another. In other words, the plurality of components, once mated with one another, form a housing assembly to hold the personal communication device 110. The housing assembly allows a user to insert the personal communication device 110 into the active case 120, so that the active case 120 can actively monitor activities of the personal communication device 110. The housing assembly also allows the user to take the personal communication device 110 out of the active case 120 for less monitoring of the personal communication, e.g., when the user uses the personal communication device 110 for personal communication and the user prefers less monitoring by an enterprise through the active case 120.

In some embodiments, the active case 120 has one or more moveable components (e.g., a hood) operable to slide to one or more positions (e.g., up or down) as well as non-moveable components. In such embodiments, the one or more moveable components, when in a first position (e.g., hood pushed down), are mateable (e.g., mechanically and/or electrically) with the non-moving components to form a housing assembly. The housing assembly forms an enclosure that at least partially supports and holds the personal communication device 110, e.g., a partial enclosure as shown in FIG. 1 or a whole enclosure encapsulating the personal communication device 110 (not shown). When in the first position, the housing 125, along with other components of the active case 120, protects the personal communication device 110 against tracking or spying, e.g., by audio jamming, camera covering, and/or radio frequency (RF) shielding, etc. When the one or more moveable components of the housing assembly are in a second position (e.g., hood slid up), a user can take the personal communication device 110 out of the housing 125 and place the personal communication device 110 in a non-protected mode.

In some embodiments, the active case 120 includes one or more local communication devices 140 supported by the housing 125. In some embodiments, the one or more local communication devices 140 include a personal communication device interface modem (e.g., a WiFi modem, a Bluetooth (BT)/Bluetooth Low Energy (BLE) radio, an infrared radio, an NFC radio, a Lightning® (a registered trademark of Apple Inc., Cupertino, Calif.) connector, etc.) operable to provide a communication channel (e.g., wirelessly or via physical connection) between the peripheral interface and the personal communication device 110. In one direction, the communication channel carries information from the personal communication device 110 to the active case 120 for analysis and validation. In the other direction, the communication channel carries information from the active case 120 to the personal communication device 110 in order to gate electronic signal to the personal communication device 110 for the protection of the personal communication device 110 and/or supplement the functionality of the personal communication device 110.

In some embodiments, the active case 120 includes one or more remote communication devices 145 supported by the housing 125 to transmit information associated with the user equipment 110 to a remote source. For example, in a multi-user environment, using the one or more remote communication devices 145, each active case 120 can report its location and timestamp along with RF signal information to the remote source, so that the remote source can derive a threat location map identifying potentially malicious RF transmitters. The threat location map is then provided to the active case 120 through the one or more remote communication devices 145.

In some embodiments, the remote source is a trusted source, such that the communication channel between the one or more remote communication devices 145 and the remote source is authenticated and secure. In some embodiments, when the active case 120 directs the user equipment 110 to generate a distress response, the distress response is transmitted through the one or more remote communication devices 145 using the secure communication channel. The one or more remote communication devices 145, in some embodiments, include one or more wireless communication devices, such as a GPS module, a cellular communication module, or a WiFi radio. The one or more remote communication devices 145 use any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), wideband code division multiple access (W-CDMA), code division multiple access (CDMA), time division multiple access (TDMA), and/or Wi-Fi (e.g., IEEE 802.11a, IEEE 802.11b, IEEE 802.11g, IEEE 802.11n, and/or IEEE 802.11ac), or any other suitable communication protocol, including communication protocols not yet developed as of the filing date of this document.

In some embodiments, the active case 120 includes a plurality of sensors 150. For example, the plurality of sensors 150 include one or more accelerometers, radio frequency (RF) emission sensors, gyroscopes (e.g., for detecting rotational movement), and/or magnetometers (e.g., as part of an inertial measurement unit (IMU)) for obtaining information concerning the position (e.g., altitude) of the active case 120, light or optical sensors (e.g., for detecting the user covering or shielding the light), or acoustic sensors (e.g., for receiving voice command) In some embodiments, the plurality of sensors 150 are coupled with input/output (I/O) peripheral devices, e.g., a touch I/O device that can receive touch input for interacting with the active case 120. In some embodiments, the touch I/O device is an integral part of the user equipment 110 or is separate from the user equipment 110. In some embodiments, the touch I/O device includes a touch sensitive surface, which is wholly or partially transparent, semitransparent, non-transparent, opaque or any combination thereof. In some embodiments, the touch I/O device is configured to detect the location of one or more touches or near touches on the active case 120 based on capacitive, resistive, optical, acoustic, inductive, mechanical, chemical measurements, or any phenomena that can be measured with respect to the occurrences of the one or more touches or near touches in proximity to the active case 120. Software, hardware, firmware or any combination thereof can be used to process the measurements of the detected touches to identify and track one or more gestures.

As used herein, a gesture corresponds to stationary, substantially stationary, or non-stationary, single or multiple, touches or near touches on the touch I/O device. In some embodiments, a gesture is performed by moving one or more fingers or other objects in a particular manner on touch I/O device, such as tapping, pressing, rocking, scrubbing, twisting, changing orientation, pressing with varying pressure and the like at essentially the same time, contiguously, or consecutively. In some embodiments, a gesture is characterized by, but is not limited to a pinching, sliding, swiping, rotating, flexing, dragging, or tapping motion between or with any other finger or fingers. In some embodiments, a single gesture is performed with one or more hands, by one or more users, or any combination thereof. In some embodiments, through the plurality of sensors 150 and/or the touch I/O device, the active case 120 is operable to acquire timing and/or force information associated with the inputs entered through the plurality of sensors 150 and/or touch I/O device.

In some embodiments, the active case 120 includes memory 130. In some embodiments, the memory 130 includes one or more memory devices, including fixed and/or removable memory devices. In some embodiments, the memory 130 provides a non-transitory computer-readable storage medium for storing computer program instructions (e.g., the application(s)) to be executed by the controller 122. In addition, in some embodiments, the memory 130 provides secure storage of information associated with the protected device 110. In some embodiments, the memory 130 exchanges information with one or more of the controller 122, the local communication devices 140, the remote communication devices 145, or the sensors 150 via a bus. In some embodiments, the applications stored in the memory 130 include an application for exchanging information between the personal communication device 110 and an external electronic device (e.g., the active case 120). The information exchange includes, for example, transmitting information obtained by the communication devices 114 and/or sensors 118 to an external electronic device (e.g., the active case 120) or receiving information from the external electronic device, e.g., the information gathered by a supplemental functional device (not shown) and relayed by the active case 120 via a peripheral interface (not shown) and the local communication devices 140.

Though not shown in FIG. 1, in some embodiments, the active case 120 includes a peripheral interface (e.g., a backpack interface) that is coupled to the local communication device 140 and connected to a supplemental functional device (e.g., a backpack). A supplemental functional device, as described herein, is a device connectable to the user equipment 110 through the active case 120 and provides supplemental functional functions to the user equipment 110. For example, the supplemental functional device can include an RF detector and/or an RF power detector for detecting energy emitted from and/or received by the user equipment 110. The peripheral interface connects the supplemental functional device to the active case 120 and the local communication device 140 further connects the peripheral interface to the user equipment 110. In some embodiments, the active case 120 is also capable of performing the supplemental functions provided by the supplemental functional device, e.g., analyzing the RF energy emitted from or received by the user equipment 110.

In some embodiments, the peripheral interface includes physical connectors providing wired connection. In some embodiments, the peripheral interface is a wireless interface. In some embodiments, the peripheral interface includes a wireless modem operable to wirelessly communicate with the supplemental functional device. In some embodiments, the peripheral interface leverages the wireless communication capability of the local communication device 140 to communicate with the supplemental functional device. For example, the active case 120 can connect to a wireless communication enabled backpack device through a wireless peripheral interface or through a wireless modem of the local communication device 140. As such, a wireless communication enabled backpack can communicate with the active case 120 without being in contact with the housing 125 or physically connected to the peripheral interface.

In some embodiments, the active case 120 includes a controller 122 coupled to the peripheral interface, the local communication device 140, and the remote communication device 145. Embodiments of the controller 122 include hardware, software, firmware, or a combination thereof. In some embodiments, the controller 122 is operable to manage the communication channel between the personal communication device 110 and the backpack and through the local communication device 140 and the peripheral interface. In other words, the controller 122 manages a segment of the communication channel between the personal communication device 110 and the active case 120 through the management of the local communication device 140, and the controller 122 manages a segment of the communication channel between the active case 120 and the backpack through the management of the peripheral interface.

In some embodiments, the controller 122 analyzes an input received by the user equipment 110 and/or the active case 120. The controller 122 further determines if the input matches a predetermined sequence. In accordance with a determination that the input matches the predetermined sequence, the controller 122 gates an electronic signal to the user equipment 110 in order to protect the user equipment 110, e.g., placing the user equipment 110 in a distress mode.

In some embodiments, the active case 120 includes a power supply 124. The power supply 124 supplies power to the peripheral interface, the local communication device 140, and the controller 122. In some embodiments, the power supply 124 includes at least one of a battery, a charging socket, a USB connector, a power plug, and/or a power socket. In some embodiments, the power supply 124 includes a connector for a battery.

In some embodiments, the personal communication device 110 held by the active case 120 includes a processor 112, one or more communication devices 114, an input/output (I/O) interface 116, sensors 118, memory 111, and applications 113, which further includes instructions stored in the memory 111 and executed by the processor 112. In some embodiments, the personal communication device 110 is a portable communications device, such as a mobile phone, a wearable device, a tablet, a laptop computer, a digital media player, an electronic reader, or the like. In some embodiments, the personal communication device is a non-portable device, such as a desktop computer, a data storage device, a smart TV, a video game console, a smart home appliance or the like that is capable of storing, transmitting, and receiving data. It will be appreciated that the components, devices or elements illustrated in and described with respect to FIG. 1 below may not be mandatory and thus some may be omitted in certain embodiments. Additionally, some embodiments can include further or different components, devices or elements beyond those illustrated in and described with respect to FIG. 1.

In some embodiments, the processor 112 is coupled to the communication devices 114 in order to manage the communication through the communication device 114. In addition to managing the communication, the processor 112 processes data and executes applications 113, in accordance with some embodiments. In some embodiments, the applications 113 include a touch processing module that analyzes an input received by the user equipment 110 and determines if the input matches a predetermined input pattern. In accordance with a determination that the input matches a predetermined input pattern, the user equipment 110 executes a predefined command, e.g., to place the user equipment 110 in a distress mode.

In some embodiments, the processor 112 includes one or more chips chipsets embodied in a variety of forms. For example, the processor 112 can be embodied as various hardware-based processing means such as a microprocessor, a coprocessor, a controller, or other computing devices including integrated circuits, such as an ASIC (application specific integrated circuit), an FPGA (field programmable gate array), some combination thereof, or the like. Although illustrated as a single processor, it will be appreciated that the processor 112 can comprise a plurality of processors. The plurality of processors communicates with each other and collectively performs one or more functionalities. In some embodiments, the processor 112 can be configured to execute instructions that can be stored in the memory 111 or that can be otherwise accessible to the processor 112. As such, whether configured by hardware or by a combination of hardware, firmware, and software, the processor 112 is capable of performing operations according to various embodiments.

In some embodiments, the memory 111 includes one or more memory devices, including fixed and/or removable memory devices. In some embodiments, the memory 111 provides a non-transitory computer-readable storage medium for storing computer program instructions (e.g., the application(s) 113) to be executed by the processor 112. In some embodiments, the memory 111 exchanges information with one or more of the processor 112, the I/O interface 116, the one or more communication devices 114, or sensors 118 via a bus. In some embodiments, the applications 113 stored in the memory 111 include an application for exchanging information between the user equipment 110 and an external electronic device (e.g., the active case 120). The information exchange includes, for example, transmitting information obtained by the communication device 114 and/or sensors 118 to an external electronic device (e.g., the active case 120) or receiving information from the external electronic device, e.g., the information gathered by the supplemental functional devices and relayed by the active case 120 via the peripheral interface and the local communication devices 140.

In some embodiments, the I/O interface 116 provides a channel for input/output data between the processor 112 and I/O peripheral devices, such as a display, a keyboard, a mouse, a pen, microphones, cameras, and/or speakers of the user equipment 110. In some embodiments, the peripheral devices are connected to the I/O interface 116 wirelessly, e.g., via the communication devices 114. In some embodiments, I/O peripheral devices include a touch I/O device that can receive touch input for interacting with the user equipment 110. The touch I/O device receives a user input and provides the user input to the user equipment 110 in lieu of or in combination with other I/O peripheral devices, such as a keyboard, a mouse, etc. In some embodiments, the touch I/O device is an integral part of the user equipment 110 or is separate from the user equipment 110. In some embodiments, the touch I/O device includes a touch sensitive surface, which is wholly or partially transparent, semitransparent, non-transparent, opaque or any combination thereof. In other words, embodiments of the touch I/O device include a touch screen, a touch pad, a touch screen functioning as a touch pad (e.g., a touch screen replacing the touchpad), a touch screen or touchpad combined or incorporated with any other input device (e.g., a touch screen or touchpad disposed on a keyboard) or any multi-dimensional object having a touch sensitive surface for receiving touch input.

In some embodiments, the touch I/O device is configured to detect the location of one or more touches or near touches on the user equipment 110 based on capacitive, resistive, optical, acoustic, inductive, mechanical, chemical measurements, or any phenomena that can be measured with respect to the occurrences of the one or more touches or near touches in proximity to the user equipment 110. Software, hardware, firmware or any combination thereof can be used to process the measurements of the detected touches to identify and track one or more gestures. In some embodiments, the user equipment 110 is operable to acquire location, timing, and/or force information associated with inputs that are entered through the touch I/O device, e.g., through the coupling with the sensors 118 (e.g., contact intensity sensors).

In some embodiments, the one or more communication devices 114 connect the user equipment 110 and an external electronic device wirelessly or through a wired connection. In some embodiments, the external electronic device is the active case 120, such that the one or more communication devices 114 connect to the active case 120 through physical connection or wirelessly. The wireless communication protocols include at least one of, for example, Wi-Fi (e.g., IEEE 802.11a, IEEE 802.11b, IEEE 802.11g, IEEE 802.11n, and/or IEEE 802.11ac), BT/BLE, Near Field Communication (NFC), Global Positioning System (GPS), and/or cellular communication, including but not limited to long term evolution (LTE), wideband code division multiple access (W-CDMA), code division multiple access (CDMA), time division multiple access (TDMA), or Global System for Mobile Communications (GSM). The wired connections include at least one of, for example, a Universal Serial Bus (USB) connector, a High Definition Multimedia Interface (HDMI) connector, and/or a Lightning® (a registered trademark of Apple Inc. of Cupertino, Calif.) connector. In some embodiments, the input (e.g., a tactile input) received through the sensor 118 and/or the I/O interface 116 is communicated to the active case 120 via a communication channel comprising the one or more communication devices 114 of the user equipment 110 and the one or more local communication devices 140 of the active case 120.

In some embodiments, when in a particular communication mode (e.g., an airplane mode), the one or more communication devices 114 on the user equipment 110 are turned off. In such communication mode, the communication channel between the active case 120 and the user equipment 110 is disconnected. Once disconnected, in some embodiments, the active case 120 is capable of directing a signal to the user equipment 110, so that the user equipment 110 enables its one or more communication devices 114 under the direction of the active case 120. For example, in response to receiving a tactile input matching a predefined input pattern, the active case 120 wakes up the user equipment 110 to establish the communication channel comprising the communication device(s) 114 and the one or more local communication devices 140. In some embodiments, through the established communication channel, the active case 120 directs the user equipment 110 to activate a distress mode, e.g., transmitting a distress signal, communicating with emergency services, reporting potential threat etc.

In some embodiments, the user equipment 110 includes sensors 118, such as one or more accelerometers, gyroscopes, and/or magnetometers (e.g., as part of an inertial measurement unit (IMU)) for obtaining information concerning the position (e.g., altitude) of the user equipment 110, light sensors, or acoustic sensors. In some embodiments, the sensors 118 are coupled to the I/O interface 116, such that the information collected by the sensors 118 are passed to the processor 112 by the I/O interface 116 for further processing. In some embodiments, the sensors 118 are coupled to the communication device 114, such that the information collected by the sensors 118 is transmitted to another device (e.g., the active case 120) for validation and threat detection. In some embodiments, the sensor 118 is coupled to the power supply (e.g., a battery) of the user equipment 110 for obtaining the power level of the user equipment 110.

Figure 2:
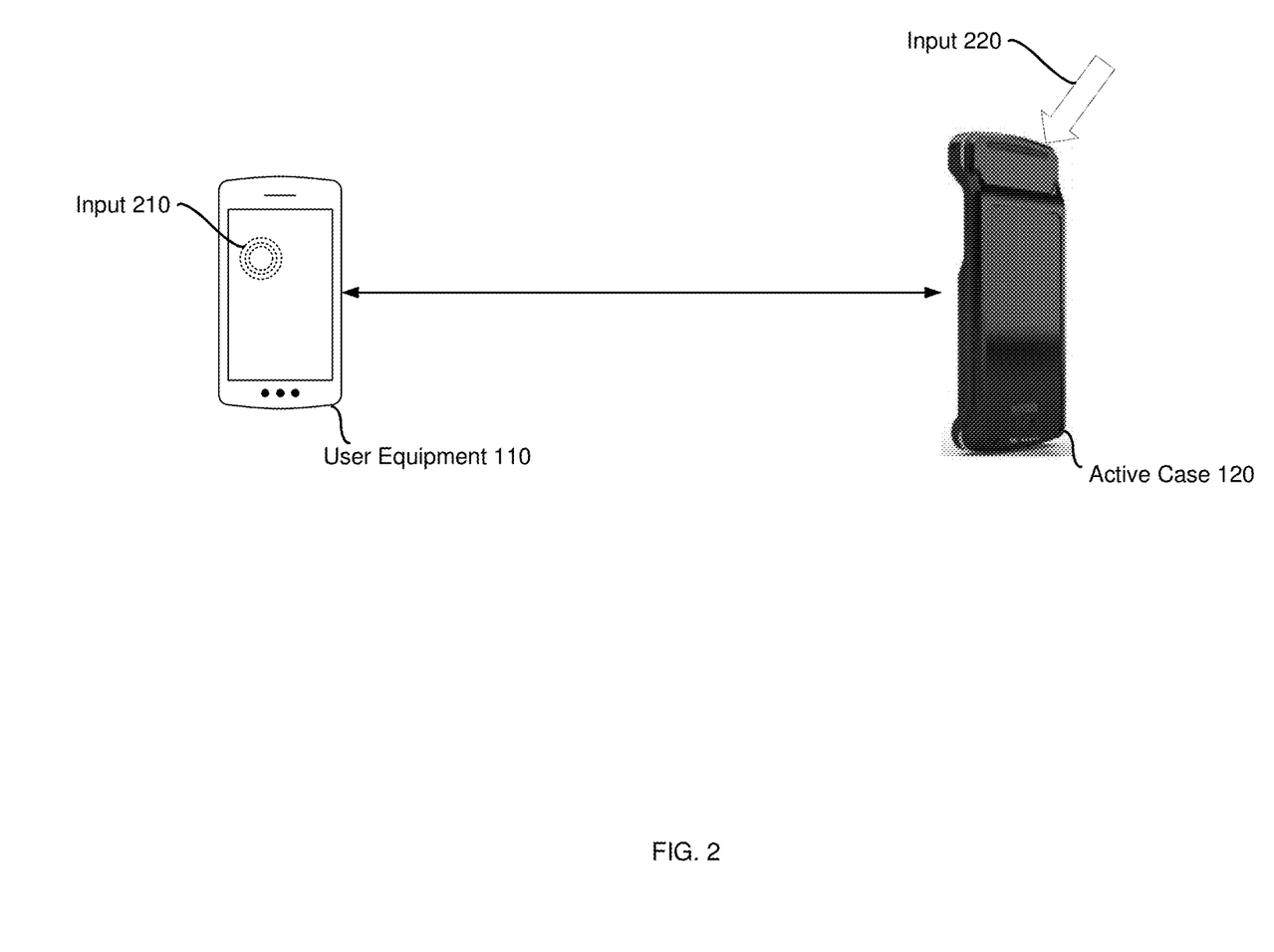
FIG. 2 illustrates activating a distress response system in accordance with some embodiments.

Turning to FIG. 2, FIG. 2 illustrates activating a distress response system, which includes the active case 120 holding the user equipment 110, in accordance with some embodiments. In some embodiments, the distress response activation is triggered by a tactile input. For example, an application (e.g., the application(s) 113 in FIG. 1) executing on the user equipment 110 obtains data associated with a tactile input 210, where the tactile input 210 is detected by the sensors 118 (FIG. 1) of the user equipment 110. In another example, instead of detecting a tactile input using the sensors 118 (FIG. 1) of the user equipment 110, the tactile input is detected by the plurality of sensors 150 (FIG. 1) of the active case 120, e.g., the active case 120 detects a tactile input 220. In such embodiments, the controller 122 (FIG. 1) of the active case 120 obtains data associated with the tactile input 220 through the coupling with the plurality of sensors 150 (FIG. 1).

In some embodiments, the input 210 and/or the input 220 can be a touch input on a touch sensitive surface of the user equipment 110 and/or the active case 120, a press input on a button or a switch of the user equipment 110 and/or the active case 120, or a movement (e.g., shaking or dropping) of the user equipment 110 held by the active case 120 in a certain pattern detected by sensors (e.g., the vibration and/or IMU sensors of the user equipment 110 and/or the vibration and/or IMU sensors of the active case 120). The application 113 (FIG. 1) and/or the controller 122 (FIG. 1) further analyze the input 210 and/or the input 220 in order to determine if the manner in which the input 210 and/or the input 220 entered match a predefined input pattern. A match indicates that the user intends for the user equipment 110 to activate the distress mode.

In some embodiments, the analysis of the input 210 and/or the input 220 includes analyzing a location, timing, force, speed, and/or acceleration of the input 210 and/or the input 220. For example, analyzing the timing data associated with the input 210 and/or the input 220 can include analyzing the time intervals between different portions of the input 210 and/or the input 220. In another example, the analysis of a double-tap input includes detecting a first touch (touch begin) on the user equipment 110 and/or the active case 120 for a predetermined duration, a first lift-off (touch end) for a predetermined duration, a second touch (touch begin) for a predetermined duration, and a second lift-off (touch end) for a predetermined duration. In yet another example, the analysis of a dragging input comprises detecting a touch (or contact) on the user equipment 110 and/or the active case 120 for a predetermined duration, a movement of the touch across the touch-sensitive surface of the user equipment and/or the active case 120, and a lift-off of the touch. The application 113 (FIG. 1) and/or the controller 122 (FIG. 1) analyze the input 210 and/or the input 220 in order to determine if the location, timing, force, speed, and/or acceleration of the input 210 and/or the input 220 match a predefined input matter.

Figure 3:
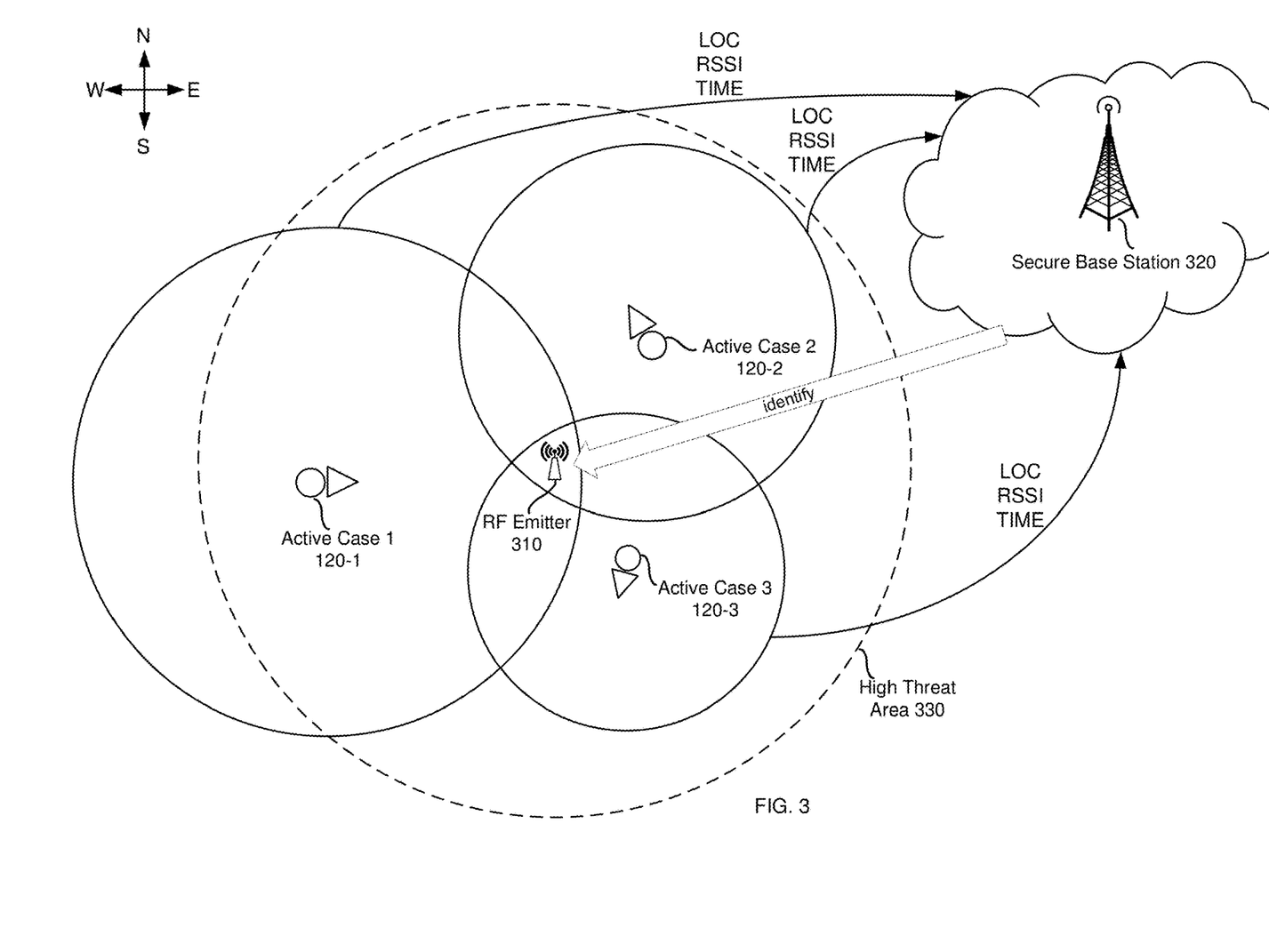
FIG. 3 illustrates establishing geo-fencing in a distress response system in accordance with some embodiments.

Turning to FIG. 3, FIG. 3 illustrates establishing geo-fencing in a distress response system, in accordance with some embodiments. Geo-fences allow a user to specify a location-based policy for taking an action when the user with a user equipment protected by the active case 120 is at or near a location and/or an area. In order to establish geo-fencing, in some embodiments, a plurality of active cases 120 in a multi-user environment, each holding a respective user equipment (not shown in FIG. 3), transmits information identifying their locations to a secure base station 320, e.g., via the remote communication device(s) 145 (FIG. 1). In some embodiments, the plurality of active cases 120 utilizes the remote communication capabilities of the communication device(s) 114 (FIG. 1) of the user equipment 110 (FIG. 1).

In some embodiments, each active case 120 (or the backpack attached to the active case 120) can send a receive signal strength indicator (RSSI) of the RF signal exchanged between an RF emitter 310 and a respective user equipment held by the active case 120, a timestamp, and a geolocation (e.g., obtained from GPS) to a cloud associated with a secure base station 320. For example, in FIG. 3, as indicated by the triangle-shaped arrowhead, the active case 1 120-1 reports its RSSI, timestamp, and location information while the active case 1 120-1 moves in an eastward direction; the active case 2 120-2 reports its RSSI, timestamp, and location information while the active case 2 120-2 moves in a northwest direction; and the active case 3 120-3 reports its RSSI, timestamp, and location information while the active case 3 120-3 moves in a southwest direction. Based on the information received from the active cases 120, the cloud associated with the secure base station 320 calculates location information of the RF emitter 310 exchanging signals with the user equipment.

In some embodiments, the secure base station 320 identifies a moving RF emitter as a potential threat, and establishes a high threat area as a geo-fence around the moving RF emitter. For example, in FIG. 3, a high threat area 330 is identified as a dotted circle centered around the RF emitter 310, and a geo-fence is established around the high threat area 330. The perimeter of the high threat area 330 is a boundary for determining when the geo-fence is triggered, e.g., when the user equipment is crossing the boundary or approaching the boundary of the high threat area 330. In some embodiments, based on the location information received from the plurality of active cases 120, the cloud associated with the secure base station 320 calculates the location of the RF emitter 310 and provides the location of the RF emitter 310 to the plurality of active cases 120. The plurality of active cases 120 then uses the location of the RF emitter 310 to establish one or more geo-fences. Accordingly, when a user equipment held by a respective active case 120 approaches, near, or at the location of the RF emitter 310, the respective active case 120 determines that a geo-fence is triggered. In response to the triggering of the geo-fence, the respective active case 120 directs the user equipment to activate the distress mode. Though FIG. 3 shows one high threat area 330, as will be shown below, a threat location map can include more than one high threat area. In some embodiments, the threat location map is communicated to the active cases 120 through the remote communication device(s) 145 (FIG. 1) of each active case 120 for the protection of the respective user equipment held by the active case 120.

Figure 4:
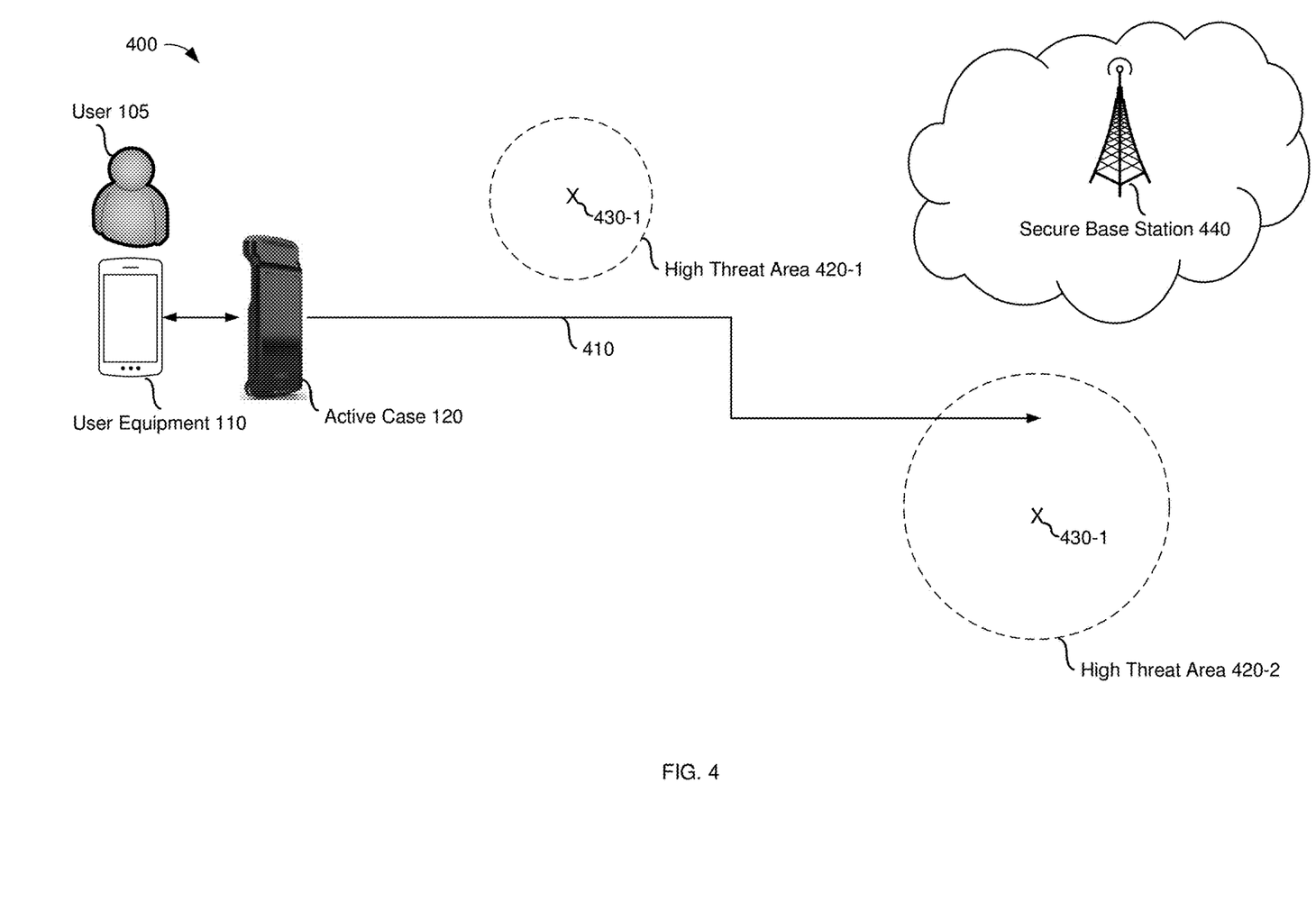
FIG. 4 illustrates a context-based distress response system using geo-fencing in accordance with some embodiments.

FIG. 4 illustrates a context-based distress response system 400 using geo-fencing, in accordance with some embodiments. As explained above in connection with FIG. 3, geo-fences allow a user to specify a location-based policy for taking an action the next time the user of the user equipment 110 held by the active case 120 is at or near a geographic location (e.g., an RF emitter 430) or area (e.g., a high threat area 420). In some embodiments, a network administrator of the context-based distress response system 400 specifies the location-based policy. Once specified, when the user equipment 110 held by the active case 120 is within a threshold distance from the high threat areas 420 and/or the RF emitters 430, the active case 120 determines that the geo-fence is triggered. In some embodiments, in response to the geo-fence triggering, the active case 120 directs the user equipment 110 to activate and enter the distress mode.

In the context-based distress response system 400, a user 105 carrying the user equipment 110 held by the active case 120 travels along a path 410. In some embodiments, a secure base station 440 identifies two high threat areas 420-1 and 420-2 along or near the path 410 in accordance with the method described with reference to FIG. 3 above. For instance, the secure base station 440 identifies a threat location map that includes the high threat area 420-1 associated with an RF emitter 430-1 and the high threat area 420-2 associated with an RF emitter 430-2. According to the threat location map, geo-fences are established such that when the path 410 crosses a perimeter of a respective high threat area 420 or is within a threshold distance of a respective location 430, a command is triggered to activate the distress mode. For instance, when the path 410 is not crossing or not expected to be within a threshold distance from the high threat area 420-1, the active case 120 does not direct the user equipment 110 to enter the distress mode. On the other hand, when the path 410 is within a threshold distance of, entering, or projected to enter the high threat area 420-2, geo-fencing is triggered. Once triggered, the active case 120 directs the user equipment 110 to activate and enter the distress mode, in accordance with some embodiments. In some embodiments, once in the distress mode, the active case 120 and/or the user equipment 110 generate a distress response, such as sending out a distress signal, shutting down the user equipment 110, communicating with emergency services, and/or shielding the user equipment 110 from intrusion.

Figure 5:
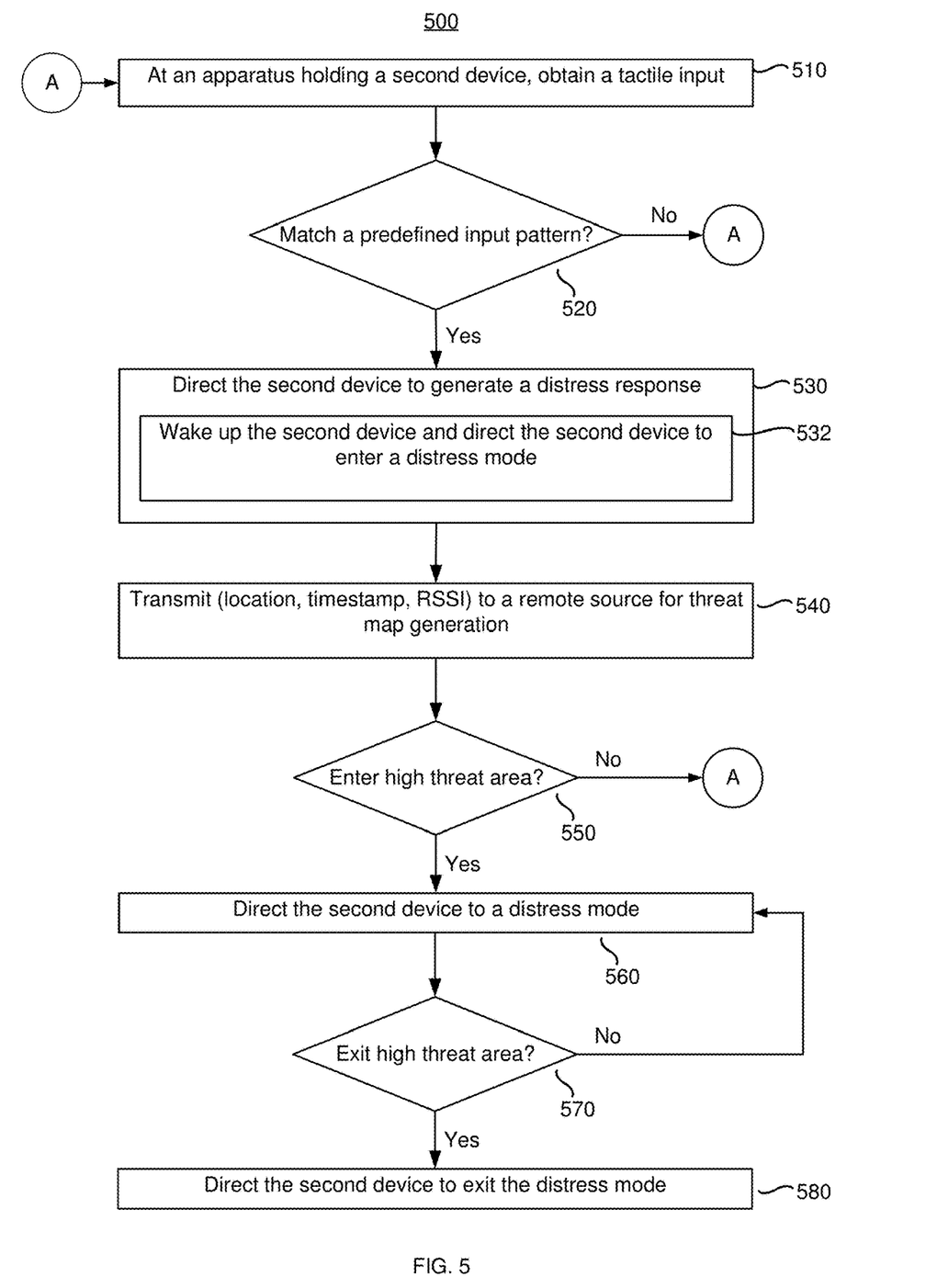
FIG. 5 is a flowchart illustrating a distress response generation method in accordance with some embodiments.

FIG. 5 is a flowchart representation of a distress response generation method 500, in accordance with some embodiments. In some embodiments, the method 500 is performed at an apparatus (e.g., the active case 120, FIG. 1) with a communication interface (e.g., the local communication device 140, FIG. 1), a controller (e.g., the controller 122, FIG. 1) and a non-transitory memory (e.g., the memory 130, FIG. 1) storing instructions for execution by the controller. Briefly, the method 500 includes obtaining a tactile input and/or a geographic location of the apparatus (e.g., the active case 120, FIG. 1), where the apparatus holds a second device (e.g., the user equipment 110, FIG. 1) for the privacy protection of the second device. In response to a determination that the tactile input matches a predetermined input pattern and/or the geographic location of the apparatus is triggering a geo-fence, the method 500 includes directing the second device to enter a distress mode. It should be noted that while the aforementioned features and components are illustrated, those of ordinary skill in the art will appreciate from the present disclosure that various other features and components have not been illustrated for the sake of brevity and so as not to obscure more pertinent aspects of the embodiments disclosed herein. Also, those of ordinary skill in the art will appreciate from the present disclosure that the functions of the components described below can be combined into one or more components and/or further subdivided into additional sub-components; and, that the components described below are provided as exemplary configuration of the various aspects and functions described herein.

To that end, as represented by block 510, the method 500 includes obtaining a tactile input on the apparatus and/or the second device (e.g., the tactile input 210 on the user equipment 110 and/or the tactile input 220 on the active case 120 as shown in FIG. 4). For example, the tactile input can be a gesture corresponds to stationary, substantially stationary, or non-stationary, single or multiple, touches or near touches on the touch-sensitive surface of the apparatus and/or the second device. In another example, the tactile input can be detected by an optical sensor (e.g., by covering or shielding the light), an acoustic sensor (e.g., by capturing sound caused by the tactile input or capturing voice command), accelerometer (e.g., by measuring the speed or acceleration of a movement of the apparatus caused by the tactile input, such as sudden dropping or shaking of the apparatus or the second device), proximity (e.g., by measuring the position change of the apparatus caused by the tactile input, such as sudden movement of the apparatus and/or the second device in certain pattern), and/or contact intensity sensors of the apparatus and/or the second device. In the embodiments in which the tactile input is received by the second device, the apparatus obtains the information associated with the tactile input from the second device through the communication interface between the apparatus and the second device, e.g., through a communication channel including the communication device 114 (FIG. 1) of the user equipment 110 (FIG. 1) and the local communication device 140 (FIG. 1) of the active case 120 (FIG. 1).

In some embodiments, as represented by block 520, the method 500 includes determining whether or not the tactile input matches a predefined input pattern. In some embodiments, the user predefines an input pattern that triggers the distress mode discreetly, e.g., a touch input on a touch-sensitive surface of the active case and/or the user equipment that matches a predefined touch input pattern. Different gestures on the touch-sensitive surface have different touch input patterns (e.g., different locations, motions, timings, speed, acceleration, and/or intensities of detected contacts). For example, a finger tap gesture pattern includes detecting a finger-down event followed by detecting a finger-up (lift off) event at the same position (or substantially the same position) as the finger-down event (e.g., at the position of an icon or a portion of a touch-sensitive surface). A double-tap pattern, for example, comprises a first touch (touch begin) on a contact point of the touch-sensitive surface for a predetermined phase, a first lift-off (touch end) for a predetermined phase, a second touch (touch begin) on the same contact point or within a predefined distance from the contact point for a predetermined phase, and a second lift-off (touch end) for a predetermined phase. In some embodiments, the duration between each successive touch input in a multi-tap input pattern is less than a predetermined amount, such as less than a fraction of a second. For example, a two-finger quadruple-tap pattern is four two-finger taps in rapid succession. In some embodiments, the predefined input pattern is a light press and/or a deep press at a predefined region of the touch-sensitive surface of the apparatus, e.g., when a contact is detected with a contact intensity above the light press intensity threshold and/or a deep press intensity threshold. In some embodiments, the predefined input pattern is associated with a button or certain part of the active case. In yet some other embodiments, the predefined input pattern is a predefined movement pattern, such as shaking the apparatus and/or the second device in certain way.

In some embodiments, when the tactile input matches the predefined input pattern ("Yes" path from block 520), the method 500 includes directing the second device to generate a distress response, as represented by block 530. On the other hand, with reference to block 520, if the tactile input does not match the predefined input pattern ("No" path from block 520), the method 500 includes circling back to the portion of the method 500 represented by block 510, where the apparatus (e.g., the active case 120) continues to monitor the second device (e.g., the user equipment 110).

In some embodiments, when the second device (e.g., the user equipment 110) enters the distress mode and/or generates the distress response, the second device (e.g., the user equipment 110) can be locked, disabled, turned off, enabled to transmit distress beacons, and/or directed to communicate with emergency services (e.g., dialing 911 and/or transmitting geographic location information). For example, the active case 120 (FIG. 1) can direct the user equipment 110 (e.g., via the local communication device(s) 140, FIG. 1) to disable or block the one or more communication channels of the user equipment 110 in order to protect the user equipment 110. In another example, the active case 120 (FIG. 1) can direct the user equipment 110 (FIG. 1) to erase or hide certain data or applications from the memory 111 (FIG. 1) of the user equipment 110 and/or the memory 130 (FIG. 1) of the active case 120 in order to protect the user equipment 110. In other words, upon activating the distress mode, sensitive data on the user equipment 110 and/or the active case 120 are destructed or hidden so that a third-party, who attempts to obtain the sensitive data from the user equipment 110, cannot reach such data.

In some embodiments, as represented by block 532, directing the second device to activate a distress mode and/or to generate a distress response includes issuing a first electronic signal to change the second device from a first communication mode (e.g., waking up the user equipment 110 from an airplane mode) to a second communication mode (e.g., enabling Bluetooth communication). For example, when the user equipment is in the airplane mode, communication channel(s) between the active case and the user equipment may be turned off. In the distress mode, the controller 122 (FIG. 1) of the active case 120 (FIG. 1) can issue a signal to wake up the user equipment 110, so that the communication device 114 (FIG. 1) (e.g., Bluetooth) on the user equipment 110 can be enabled and a communication channel can be enabled.

In some embodiments, in order to establish the communication channel, the apparatus also changes its communication mode. For example, the apparatus can be in the first communication mode (e.g., the airplane mode) when the controller 122 (FIG. 1) determines to activate the distress mode. In some embodiments, in the airplane mode, the active case 120 disables its communication devices so that RF emissions are not detectable. In such embodiments, in the distress mode, the controller 122 (FIG. 1) transitions out of or exits the first communication mode to enable the local communication device 140 (FIG. 1). Consequently, the communication channel between the user equipment 110 (FIG. 1) and the active case 120 (FIG. 1) can be established through the enabled communication device 114 (FIG. 1) and the local communication device 140 (FIG. 1).

Upon enabling the communication channel, the active case 120 (FIG. 1) can then issue the first electronic signal and communicate the first electronic signal through the enabled communication channel to the user equipment 110 (FIG. 1). In some embodiments, the active case 120 (FIG. 1) can send another electronic signal to direct the user equipment 110 (FIG. 1) to generate the distress response. In some embodiments, as part of the distress response, the active case 120 retrieves necessary information from the user equipment 110 (e.g., the SIM information) and transmits such information to a remote source (e.g., the secure base station 320 in FIG. 3 and/or the secure base station 440 in FIG. 4).

In some embodiments, as represented by block 540, the method 500 includes transmitting to the remote source a location, a timestamp, and signal strength information for threat location map generation. For example, in a multi-user setting, as shown in FIG. 3, each active case 120 sends RSSI, time, and geolocation to the secure base station 320, so that the secure base station 320 can triangulate and generate a threat location map including locations of RF transmitters. The threat location map identifies the high threat area 330 around the potentially malicious RF emitter 310. Upon request or periodically, the threat location map including the location of the RF emitter 310 and the associated high threat area 330 is provided to the active cases 120.

In some embodiments, as represented by block 550, the method 500 includes comparing the information contained in the threat location map with movement and location information of the apparatus (e.g., the direction the apparatus is moving, the speed the apparatus is moving, etc., as shown in FIG. 4) and determining whether to direct the second device to enter a distress mode based on the comparison. In some embodiments, in response to determining that the apparatus holding the second device is entering or projected to enter the high threat area ("Yes" path from block 550), the method 500 includes directing the second device to the distress mode, as represented by block 560. On the other hand, with reference to block 550, if the apparatus holding the second device is not entering or is not projected to be within a threshold distance from the high threat area (e.g., the high threat area 420-1 is not along the path 410 of the active case 120 as shown in FIG. 4) ("No" path from block 550), the method 500 includes circling back to the portion of the method 500 represented by block 510, where the apparatus continues to monitor the second device.

In some embodiments, as represented by block 570, the method 500 includes monitoring the movement and location of the apparatus and determining whether the second device is exiting the high threat area. In some embodiments, in response to determining that the apparatus holding the second device is exiting the high threat area ("Yes" path from block 570), the method 500 includes directing the second device to exit the distress mode, as represented by block 580. On the other hand, with reference to block 570, if the apparatus holding the second device is not exiting the high threat area ("No" path from block 550), the method 500 includes circling back to the portion of the method 500 represented by block 560, where the second device remains in the distress mode and the apparatus continues to monitor the second device.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. An apparatus comprising:
a housing arranged to hold a second device;
one or more sensors, at least partially supported by the housing, operable to obtain a tactile input;
a communication interface, at least partially supported by the housing and connectable to the second device, operable to communicate with the second device; and
a controller, coupled to the communication interface and the one or more sensors, operable to direct the second device, through the communication interface, to generate a distress response in response to receiving the tactile input.

2. The apparatus of claim 1, wherein the distress response includes one or more of locking, shutting off, transmitting distress beacons from, communicating with emergency services from, or disabling the second device.

3. The apparatus of claim 1 further comprising a memory coupled to the controller to store data, wherein the controller is operable to direct erasure of the data in response to receiving the tactile input.

4. The apparatus of claim 1, wherein the one of more sensors include one or more of a gyroscope, a radio frequency (RF) emission sensor, a magnetic field sensor, a compass, an optical sensor, an acoustic sensor, an acceleration sensor, a proximity sensor, a touch-sensitive sensor, or a contact intensity sensor.

5. The apparatus of claim 1, wherein the tactile input is received by the second device and communicated to the apparatus via the communication interface.

6. The apparatus of claim 1, wherein the tactile input matches a predefined input pattern.

7. The apparatus of claim 1, wherein the apparatus includes one or more remote communication devices supported by the housing operable to communicate with a remote source.

8. The apparatus of claim 7, wherein the distress response is a distress signal communicated to the remote source through the one or more remote communication devices.

9. The apparatus of claim 7, wherein the remote source obtains a location, a timestamp, and a signal strength from the apparatus, calculates information of a radio frequency (RF) emitter in communication with one or more of the apparatus and the second device, and provides the information of the RF emitter to the apparatus through the one or more remote communication devices.

10. The apparatus of claim 9, wherein the controller is coupled to the one or more remote communication devices, the controller receives the information of the RF emitter from the one or more remote communication devices, compares the information of the RF emitter with movement and location information of the apparatus, and determines whether to direct the second device to enter a distress mode based on the comparison.

11. The apparatus of claim 10, wherein the controller monitors the movement and location information of the apparatus, and directs the second device to enter the distress mode based a projection of the apparatus approaching a geographic area associated with the RF emitter.

12. The apparatus of claim 10, wherein the controller directs the second device to exit the distress mode based on a determination that the apparatus is exiting a geographic area associated with the RF emitter.

13. The apparatus of claim 1, wherein the controller directs the second device to generate the distress response by issuing a first electronic signal to change the second device from a first communication mode to a second communication mode, establishing a communication channel through the communication interface, and sending a second electronic signal to the second device through the communication channel to cause the second device to generate the distress response.

14. A method comprising:
  at an apparatus including a controller and a communication interface, wherein the apparatus holds a second device:
  obtaining a tactile input on the apparatus or the second device;
  determining whether or not the tactile input matches a predefined input pattern;
  in response to a determination that the tactile input matches the predefined input pattern, through the communication interface, directing the second device to generate a distress response.

15. The method of claim 14 further comprising, in response to receiving the tactile input, performing one or more actions of erasing data stored on the apparatus and erasing data stored on the second device.

16. The method of claim 14, wherein the tactile input is detected by one of more sensors including one or more of a gyroscope, a radio frequency (RF) emission sensor, a magnetic field sensor, a compass, an optical sensor, an acoustic sensor, an acceleration sensor, a proximity sensor, a touch-sensitive sensor, or a contact intensity sensor.

17. The method of claim 14, wherein the tactile input is received by the second device and communicated to the apparatus via the communication interface.

18. The method of claim 14, wherein a predefined input pattern is associated with a gesture pattern.

19. The method of claim 14, wherein directing the second device to generate the distress response includes:
  issuing a first electronic signal to change the second device from a first communication mode to a second communication mode; and
  establishing a communication channel through the communication interface;
  sending a second electronic signal to the second device through the communication channel, wherein the second electronic signal causes the second device to generate the distress response.

20. The method of claim 14 further comprising communicating the distress response to a remote source, wherein the distress response includes one or more of locking, shutting off, transmitting distress beacons, communicating with emergency services, or disabling the second device.

* * * * *